350-360 SR SEARCH ROOM
XR 3,283,309
ADDED

Nov. 1, 1966 J. GAYNOR 3,283,309

THERMOPLASTIC INFORMATION RECORDING

Filed Aug. 20, 1962

CROSS REFERENCE

Inventor:
Joseph Gaynor,
by Paul A. Frank
His Attorney.

3283309
OR IN 340/173TP 3,283,309
Patented Nov. 1, 1966

3,283,309

INFORMATION THERMOPLASTIC RECORDING

Joseph Gaynor, Schenectady, N.Y., assignor to General Electric Company, a corporation of New York Filed Aug. 20, 1962, Ser. No. 218,083
10 Claims. (Cl. 340—173)

This invention pertains generally to the recording of information in the form of light-modifying deformations on a deformable storage member and the retrieval of such information. More particularly, the present invention pertains to the recording and retrieval of information on a supported recording layer of thermoplastic material which is optically reflective so that information stored on the surface of the recording layer as light-modifying deformations may be read out in an improved manner.

A video recording device which employs a solid recording medium having a thermoplastic surface on which television pictures and other forms of data are permanently recorded by direct electron beam writing has been described in a copending application, Serial No. 8,842, filed February 15, 1960 now Patent No. 3,113,179 by W. E. Glenn, entitled "Method and Apparatus and Medium for Recording," and assigned to the assignee of the present invention. The technique has also been applied to the storage of digital data as well as analog data in forms other than a video picture. In the embodiments illustrated in that application there is employed a light optical readout arrangement wherein light is passed through the light-modifying depressions in the solid recording medium where it is modified by bending, etc., in accordance with the intelligence modulated on the medium. A modified readout arrangement disclosed in the copending application passes light through the thermoplastic recording member containing the light-modifying deformations and thereafter reflects the transmitted light of the underlying substrate for return through the thermoplastic medium and projection to a viewing surface. The modified light rays passing through the thermoplastic member with either modification of readout may also be used to selectively energize a photoelectric device such as a photomultiplier and the like in order to develop an output electrical signal.

Another copending patent application, now abandoned, of George F. Chafaris, Serial No. 822,097, entitled, "Method and Apparatus for Reproducing Optical Information," and assigned to the assignee of the present invention, discloses a different information recording system wherein information is stored on a thermoplastic recording member in the form of light-modifying deformations so constructed that light rays employed for retrieval of the information are reflectively scattered during passage through the recording member. More particularly, a storage member is utilized which comprises a transparent thermoplastic tape having embedded therein a homogeneous distribution of tiny light-scattering particles so that after information has been stored on the surface of the member by selective deformation, readout may be accomplished by placing the modulated tape in a suitable optical system responsive to scattered light and projecting a light beam through the member to obtain a visual image dependent upon the extent of scattering in the projected light during passage through the member. The thicker elemental portions of the deformed tape contain a larger number of scattering particles which create a brighter area in the output image when displayed in an optical projector. Thus, the projected light is intensity-modulated by the scattering particles to form the desired image. The recording medium may be fabricated by mixing the light-scattering particles in a liquefied form of the thermoplastic material in a density to effectively scatter light transmitted through the tape without substantial attenuation of the light as it emerges from the tape.

In a further copending patent application entitled, "Information Storage on Deformable Medium" of the present inventor, Serial No. 79,260, filed December 29, 1960, and assigned to the assignee of the present invention, a system of information recording is disclosed for storing information, again in the form of light-modifying deformations on the surface of a deformable photoconductor. In that invention, the information to be stored is transmitted by activating radiation onto a uniformly charged deformable photoconductive member and by reason thereof, the photoconductive member becomes selectively discharged according to the pattern of the activating radiation. The selectively charged member is developed by softening the deformable medium so that forces of the electrostatic charge pattern deform the medium in accordance therewith. Upon cooling the medium, the deformations become permanently fixed on the surface of the storage member and are thereby permanently stored unless deliberately erased by heating. Retrieval of the information stored in the deformed storage member is again obtained by projecting a light beam through the medium for direct optical readout on a viewing surface or conversion to electrical signals by means of the aforementioned light-sensing devices.

While generally satisfactory recordings are provided by the information storage processes above described including erasure of the deformations by reheating and reuse of the reconditioned recording member a number of times, certain problems still remain with respect to the faithfulness of retrieving the recorded information. Specifically, in all the embodiments disclosed for the mentioned copending applications, there is transmission of a light beam through the thermoplastic layer of a recording member regardless of whether transmissive or reflective optical readout methods are employed. Stated in another way, the recording member is always in the optical path of the projection system used for readout with the projected light passing through at least the thermoplastic layer of the member. Unfortunately, any readout of information whereby light is projected through the storage member is sensitive to optical discontinuities in the form of bubbles, particulate contaminants, and even compositional differences which produce localized index or refraction changes in the medium. Thus, the faithfulness of readout is reduced by the presence of discontinuities in the member and will be observed even with the most carefully selected optical grade materials for the recording medium. As information density increases in the storage member, the critical flaw size decreases to values which defy process control. Additionally, many optical systems for projecting the light beam through the deformed storage member are sensitive to changes in member thickness so that faithfulness of readout is again adversely affected by thickness variation, especially at high storage density levels. These and other difficulties will be minimized in a recording system wherein information is retrieved by means other than projecting a beam of light through any portion of the storage member. The information storage density in a recording member not sensitive to defects in the composition of the member will also be increased. Other advantages which accrue from a system of retrieving information by means other than projecting light through the recording member include wider selection of recording materials such as opaque thermoplastics, metal supports, and the like. Retrieval of information from a storage member particularly adapted for reflective optical readout which is insensitive to compositional discontinuities in the member offers a more convenient, efficient, and even simplified recording process than is disclosed in the aforementioned copending inventions.

It is an important object of the invention, therefore, to provide an improved method and system for storing information directly on a supported recording layer of thermoplastic material in the form of light-modifying deformations.

Another important object of the invention is to provide a thermoplastic recording member which allows retrieval of information present in the form of light-modifying deformations directly from the recording surface by reflective optical techniques.

Still another important object of the invention is to provide an improved system and method for storage of information directly on a supported recording layer of thermoplastic material in the form of light-modifying deformations which are readily discernible to the unaided eye.

These and other important objects and advantages of the invention will be apparent from the following description taken in connection with the accompanying drawings in which.

Briefly, the improved storage member of the invention upon which can be produced a truly visible image in the form of light modifying deformations capable of readout by reflected light comprises a supported recording layer of thermoplastic material containing a sufficient quantity of optically reflective particulate solids of particle size below the desired resolution of recording in the thermoplastic material to reflect a beam of light projected onto the surface of the recording layer. A relatively uniform dispersion of particulate solids in the thermoplastic medium is preferred so that the beam of light projected onto the deformed recording layer is reflected from particles at or adjacent the incident surface. A deformation image recorded on the modified storage member of the invention in accordance with the general recording processes disclosed in the above-referred-to copending patent applications may be readily visible in ordinary daylight depending on the density of recording so that no further optical means may be necessary for retrieval of stored information. For example, ordinary photographic negatives may be printed on the present storage members by the aforementioned processes and observed directly by reflected ordinary light rays with the unaided eye. Since the resolution capability of the present storage members permits storage of information and density much beyond that discernible to the unassisted eye of the observer, however, it may be desirable to employ reflective optical magnification systems for retrieval of the stored information in order to utilize the maximum storage potential of recording. An optical system for projecting a reflective beam of light from the deformations which is particularly adapted for accomplishing retrieval of data stored in microscopic bits is described in greater detail hereinafter in the specification. Other optical projection systems which project a beam of light from an external source onto the surface deformations and sense the variation and angle of reflection with change of surface contour for the reflected beam by optical means may also be suitably employed for retrieval of the stored information.

Having described the invention generally, it may be practiced in its preferred embodiments as illustrated in the following examples and subsequent discussion thereon. Where parts and percentages appear hereinafter in the specification, the reference is to parts and percentages by weight unless otherwise specified.

Figures 1, 4:
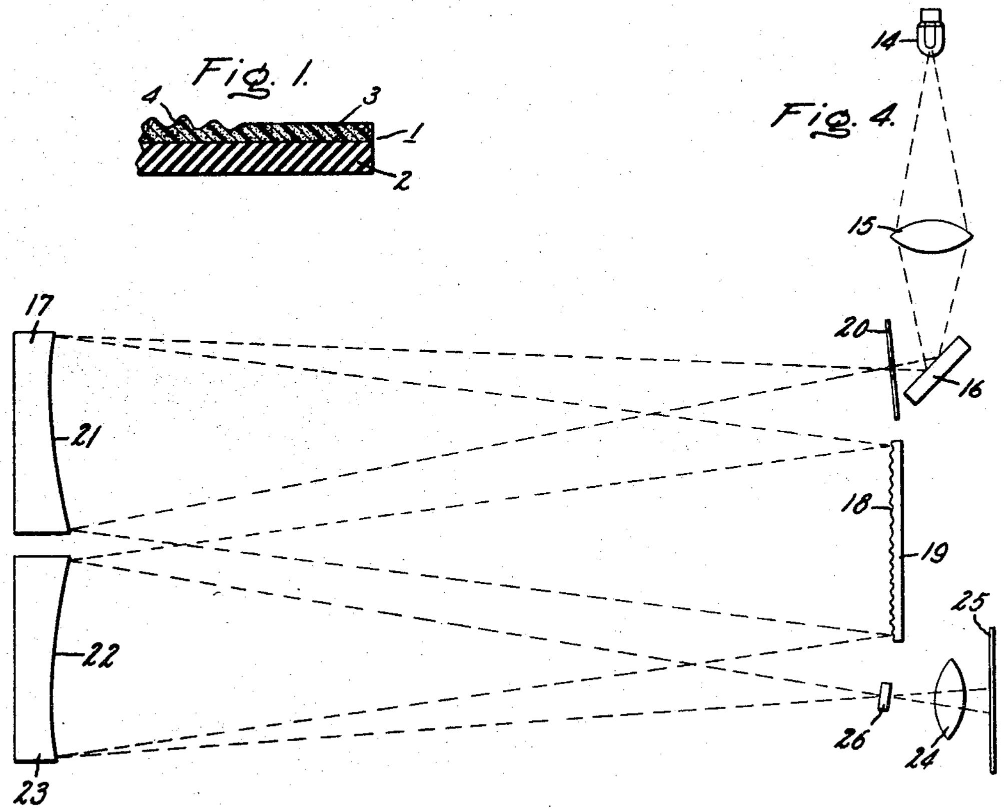
FIGURE 1 is a cross-sectional view of one preferred information storage member of the invention illustrating the information-containing deformations.
FIGURE 4 is a schematic representation of a schlieren optical system particularly adapted for reflective readout of the stored information by the method of the invention.

In FIGURE 1 there is shown a cross-sectional view of a preferred recording member of the invention containing stored information in the form of deformations as depicted as undulations on the surface of the recording layer. The general physical configuration of the recording member may consist of an endless tape for convenience in recording and storage in a wound condition. The general elements of the recording member in this embodiment together with suitable materials of fabrication are described in greater detail in the aforementioned Glenn invention, Serial No. 8,842, which is hereby incorporated in the present specification for purposes of more clearly describing the present invention. More particularly, tape member 1 of the present embodiment comprises a thermoplastic coated thin film having dielectric base layer 2 coated with a relatively thin thermoplastic recording layer 3 containing optically reflective particulate solids of particle size below the desired resolution of recording. Suitable thermoplastic compositions for the recording layer can be characterized as heat-softenable resins which when heated to the liquid or softened state may be selectively deformed in response to the forces of the electrostatic charge pattern. Representative materials are well-defined in the aforementioned Glenn application so that no greatly detailed description of suitable thermoplastic compositions need further be presented in this specification. It bears mention, however, that while the preferred thermoplastic compositions disclosed in the Glenn invention are optically clear to allow projection of a light beam through the recording layer for retrieval of the stored information, opaque thermoplastics may be suitably employed in the practice of the present invention since retrieval is accomplished by reflection of light from the exposed surface of the recording layer. Consequently, thermoplastic compositions having an electrical resistivity higher than $3 \times 10^{10}$ ohm-centimeters at the elevated temperatures employed to develop the information-bearing deformations at which the composition has also a viscosity on the order of 4,000 centipoises are described in the said Glenn invention and may also be suitably employed in fabricating the recording member of the present embodiment.

Base layer 2 of the present member is preferably of greater thickness than the recording layer to impart sufficient mechanical strength to the composite assembly for ordinary handling as well as provide a heat sink for cooling the thermoplastic recording layer during the information recording process. The added mechanical strength provided by the base or support layer is desirable since the recording layer thickness is preferably 2–20 microns thick for optimum recording by the Glenn process. Base layer thicknesses ranging from about 25 microns to about 4 mils for a reasonably flexible material may be suitably employed in fabricating the present member. Preferred compositions for fabrication of the base layer are thermoplastics having a higher softening or liquid temperature than the thermoplastic material in the recording layer for over-all flexibility of the composite assembly as well as to promote adhesion between the recording layer and the base. Suitable thermoplastic resins for the base layer include polyethylene terephthalate, acetals, silicones, polycarbonates, and others, having the before mentioned desirable characteristics.

The deformations 4 depicted on the surface of the embodied recording member comprise crests and depressions in the surface formed by movement of the thermoplastic material responsive to the forces generated by the selective electrostatic charge pattern. The crests of the deformations are generally higher than the recording layer with the alternating depressions extending well into the layer due to the nature of the charge-forming mechanism. The deformation pattern can approach a regular sinusoidal shape or be quite irregular in surface contour depending upon the exact method of electrostatic charging used in the recording process. Thus, it is within the contemplation of the invention to employ recording processes disclosed in the Glenn invention for single color recording where the deformation or groove pattern has the sinusoidal distribution depicted in the drawing as well as for multiple color recording where the groove pattern will be irregular in some places due to the presence of several colors in the recorded information.

*Example 1*

A suitable coating composition may be prepared for the recording layer of the above-described embodiment by mixing approximately 10 parts of pigment grade titanium dioxide into approximately 1,000 parts of a 10 percent solids benzene solution of a commercially available polystyrene material until a homogeneous dispersion is obtained. A useful polystyrene material for the composition has an average molecular weight of approximately 20,000, an electrical resistivity of around $10^{15}$ ohm-centimeters, and a softening temperature of approximately 85° C. Fabrication of a recording tape from this coating composition may be obtained simply by overcoating a commercially available polyethylene terephthalate film with a thin layer of the composition and evaporating the solvent by conventional air drying or heating techniques. Optical reflectance measurements made on the exposed surface of the final solid recording member with a General Electric recording spectrophotometer varied from approximately 70 percent reflectance at 4,000 angstroms wavelength to approximately 85 percent reflectance at 7,000 angstroms, indicating relatively low light scattering losses over the entire measured spectral range. Actual recordings on the member indicate performance substantially comparable to that obtained in the Glenn invention with the added advantage that the present opaque recording layer allows readout directly from the recording surface.

Figure 2:
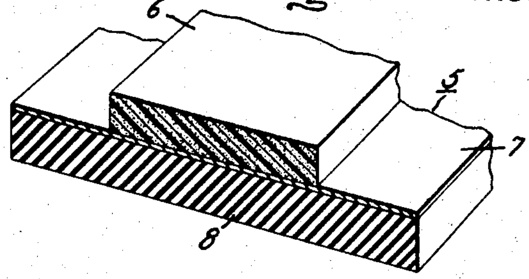
FIGURE 2 is a perspective view, partially in cross section, illustrating a different preferred information storage member of the invention.

In FIGURE 2 there is shown a perspective view, partially in cross section, of a photoconductive recording member of the invention having a general physical configuration which may consist again of an endless tape. Tape member 5 has a photoconductive thermoplastic recording layer 6 which overlies conducting metal layer 7 and is adherent thereto, together with a flexible dielectric support layer 8 adhered to the underside of the metal conducting layer. As was also true of the tape in the preceding figure, all layer elements of the composite member have been greatly exaggerated in thickness for clarity of illustration although the relative thickness of each layer element is roughly in proportion to the other elements of the structure. The arrangement of the conducting metal inner layer in the present recording member permits heating of the surface recording layer during development of the deformations by contacting electrodes, although other means of heating such as induction heating, RF heating, and the like, may still be employed for this purpose with the structure. Useful photoconductive recording members, which may be suitably modified for practice of the invention by incorporating optically reflective particulate solids in the thermoplastic composition for the recording layer of the member, are disclosed in the aforementioned Gaynor invention, Serial No. 79,260, together with suitable materials of fabrication. Thus, a flexible recording tape of the present embodiment having the requisite degree of flexibility for winding the tape around small diameter mandrels may be constructed with a photoconductive thermoplastic recording layer ranging from approximately 2–50 microns in thickness, a conducting metal inner layer ranging in thickness from about 0.001–0.1 micron thickness, and a backing or support layer of a suitable thermoplastic polymer ranging in thickness between 25 microns to about 4 mils or greater. While discernible images are obtained on these recording layers over the entire specified thickness range, it is sometimes difficult to obtain sufficient depth of the deformations for a well-defined image with a layer thickness less than about 4 microns, especially at the fast writing speeds possible with the present system. At thicknesses of the recording layer greater than about 50 microns, many thermoplastic films are sufficiently inflexible to cause delamination from the remaining member. Suitable thermoplastic compositions for the recording layer of the present embodiment are disclosed in said copending Gaynor application which is hereby incorporated by reference in order to clearly illustrate practice of the present invention.

Useful compositions include such diverse materials as thermoplastic photoconductive polymers, mixtures of inorganic photoconductive solids with thermoplastic nonphotoconductive polymers, and mixtures of organic photoconductors with thermoplastic nonphotoconductive polymers. Dispersion of the particulate optically reflective solids into these compositions provides a recording layer having the necessary characteristics for information storage by the general process of the reference invention together with capacity for readout of the stored information by reflecting light from the recording surface.

*Example 2*

A suitable coating composition from which recording members of the above embodiment may be obtained is prepared by dispersing a photoconductor in the general formulation disclosed in the preceding example. Accordingly, 10 parts of anthracene are dissolved in 1,000 parts of a 10 percent by weight polystyrene solution containing 8 parts of powdered aluminum metal. A flexible recording tape with the configuration depicted in FIGURE 2 may be prepared with this composition from a commercially available polyethylene terephthalate film by first vacuum depositing a thin film of metallic copper on the surface of the polymer film and then exposing the copper coated layer to iodine vapor to form a conducting cuprous iodide film. For a more detailed description of the method and apparatus for producing such a cuprous iodide film, reference is hereby made to U.S. Patent 2,756,165, entitled, "Electrically Conducting Films and Processes for Forming Same" by D. A. Lyon, issued July 24, 1956. Thin films of the cuprous iodide along with other metallic materials such as chromium, iron, nickel, and even such metal oxides as indium, are sufficiently flexible so that the final tape may be wound around small diameter mandrels down to around three-eighths inch diameter which is the usual requirement encountered with rolled tapes and projection machines. A thin surface layer of the above prepared coating composition may then be deposited on the outer surface of the conducting metal layer by conventional means and the organic solvent thereafter removed to provide the recording element of the embodied member. An optical image from an ordinary photographic negative may now be directly copied on the prepared recording tape in accordance with the process described in the above-mentioned Gaynor application. The deformation image from the negative is of sufficient optical quality to be discernible with the unaided eye by ordinary reflected daylight. Reflectance measurements made on the recording layer by spectrophotometer yields approximately 60–65 percent spectral reflectance over the entire visible spectrum. The remaining recording characteristics of the prepared member are substantially comparable to the results recited in the reference invention.

While preference has been indicated in all of the above description for recording members in the form of flexible tapes for ease and convenience of storing and recording information thereon, it will be realized that other recording media may also be suitably employed in the practice of the invention. For example, where is proves desirable to record information on inflexible substrates such as glass slides, metal plates, ceramic structures, and the like, certain modifications may be made in constructing the member. Accordingly, a recording member having a glass slide or plate for the supporting element may be prepared by depositing or adhering a conducting layer to one side of the plate and overcoating the exposed surface of said layer with a coating composition of the thermoplastic recording material containing optically reflective particles. In such construction, conducting layers of greater thickness than hereinbefore specified may be employed consistent with the electrical requirements for grounding the recording layer during the recording process and heating the layer for development of the deformations. If radio frequency heating is selected for the method of heating, an electrical resistivity for the metal layer of between 1,000–10,000 ohms per square centimeter has been found to be the optimum for developing a deformation pattern in the recording layer. Likewise, a recording member suitable for the practice of the invention may be prepared simply by coating a metal plate with a thermoplastic recording material having the optically reflective particles dispersed therein.

Figure 3:
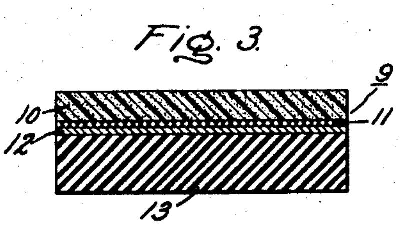
FIGURE 3 is a cross-sectional view of still a different preferred information storage member of the invention.

In FIGURE 3 there is shown a cross-sectional view of a still different preferred information storage member of the invention which again may consist conveniently of a flexible endless tape. Recording tape 9 comprises an outermost surface recording layer 10 of a thermoplastic resin containing the optically reflective particles dispersed uniformly throughout, a next lower layer 11 of a suitable photoconductor, a conducting metal layer 12 directly below the photoconductor layer, and a dielectric support layer 13 adhered to the bottom side of the conducting layer. In this construction, the deformable photoconductive medium of the member comprises a composite association of the surface thermoplastic layer 10 and the underlying photoconductor 11 to control the formation of an electrostatic latent image and deformations on the surface by the aforementioned Gaynor process. Thus, it is not essential for successful practice of this process to have a molecular association between photoconductor and the deformable recording material to obtain information-bearing deformations on the surface of the latter medium with adequate recordings being provided by the stratified arrangement of the embodiment wherein the photconductor is in direct physical association with the deformable medium through contact. A satisfactory recording layer for the embodied member may consist of simple mixtures of a thermoplastic resin with effective amounts of the discrete optically reflective particles to reflect a beam of light projected onto the surface of the layer. For proper exposure of the photoconductive element to light, it will be necessary for the recording layer to be partially transparent or to conduct the exposure through a transparent backing for this element. Remaining elements 12 and 13 of the embodied recording member may conveniently be of the same construction as the previously described elements in FIGURE 2. Photoconductive layer 11 may be prepared in conventional fashion by bonding known photoconductive materials including inorganic substances such as selenium, sulfur, phosphors, and zinc oxide as well as such organic compounds as tetracyanoethylene, chloranil, anthracene, and even including suitable organic dyes such as crystal violet, malachite green, basic fuschin, trypaflavine, methylene blue, pinacyanol, kryptocyanine, neocyanine, certain proteins, and others.

*Example 3*

To illustrate still other deformable thermoplastic compositions useful for the recording layer in the practice of the invention, an optically reflective recording member may be prepared in the same general manner as previously described from a uniform dispersion of approximately 12 parts zinc sulfide pigment in 100 parts polystyrene or other suitable thermoplastic resin. Fairly uniform reflectance measurements are obtained from the recording layer prepared therefrom which range upwardly from approximately 76 percent reflectance at 4,000 angstroms wavelength to a peak reflectance of 91 percent in the region 4,800–6,200 angstroms wavelength and thereafter falling off to about 63 percent reflectance at 7,000 angstroms.

In FIGURE 4 there is shown a schematic representation of a preferred schlieren optical system which is particularly adapted for reflective readout of microbit information stored on the recording members of the invention. With this particular information retrieval system, a beam of light is projected onto the deformed surface of the recording member from which it is reflected for further transmission to a schlieren bar arrangement and thereafter projected onto a viewing screen for observation. In the depicted arrangement, light from an external lamp source 14 is projected through a field lens 15 for focusing onto a mirror 16 positioned to reflect the focused beam onto a paraboloidal mirror 17 for further projection onto the deformed surface 18 of the recording member 19. Slit member 20 interposed between the flat mirror and paraboloidal mirror 17 helps collimate the light beam being projected onto the recording surface layer with further collimation being achieved from the reflecting surface 21 of said paraboloidal mirror. The light beam being reflected from deformed surface layer 18 of the recording member is projected onto the reflecting surface 22 of paraboloidal mirror 23 from where it is pojected onto field lens 24 for transmission onto a viewing screen shown schematically at 25. In the absence of deformations on the recording layer surface, the reflected light beam would be projected onto paraboloidal mirror 23 and focused onto the opaque schlieren stop member 26 with no further passage of light to field lens 24. Under these circumstances, the screen would be blacked out because all of the light has been intercepted by the blocking member. Modulation of the light beam by deformations on the recording layer surface results in deviation of the beam's further passage so that focus is above or below the stop, and a light image will be projected on the screen in accordance with the slope of the deformations. In this manner of operation, the projected image on the viewing screen will vary in light intensity as a function of the depth and spacing of the deformations on the recording surface layer.

While the preferred embodiment in FIGURE 4 depicts a reflective optical schlieren system employing a single bar or blocking member for simplicity and ease of illustration, it will be realized that a multiple bar system offers advantages by way of greater resolution for the information retrieved from the deformations on the recording member. The complete operating details and advantages of a transmissive type multiple bar schlieren optical readout system for retrieving information from the deformations on a recording member may be found in U.S. Patent 2,813,146, William E. Glenn, issued November 12, 1957. The particular reflective schlieren system of the embodiment is preferred because of simplicity and ease of construction although it will be realized that other reflective readout systems can also be used if modified in accordance with the present described principles. For example, other reflective schlieren systems which may be suitably modified include devices described in the Journal of the Optical Society of America, 1945, page 197; Journal of the Society of Motion Picture and Television Engineering, October 1952, page 500, and December 1953, page 487; and the article entitled, "L'Emploi de la Strioscope Interferentielle," by C. Veret, Optics and Meteorology, 1960, page 308; and the like. Since the present process may also be used to print out ordinary photographic negatives wherein the recorded deformations will generally be visible to the unaided eye, it is not essential to employ schlieren optical systems for retrieval of the information and any optical system which projects a beam of light from an external source onto the deformed surface and senses the variation in angle of reflection with change of surface contour for the reflected beam can be used. Where the information recorded on the deformed recording layer is in the form of parallel, closely spaced grooves, the recording layer surface may simply be scanned with a beam of visible light having a beam width equal to or more narrow than the individual grooves.

Certain essential characteristics of the present recording members are required to insure faithful recording of information utilizing the aforementioned basic Glenn and Gaynor processes. More particularly, to create deformations in the recording layer which faithfully reflect the image being recorded, it will be necessary to maintain the size of the optically reflective discrete particles in the recording layer substantially below the groove size of the deformations. Surface particles in the recording layer even approximating the groove size could so simulate deformations as to yield misleading information. A further disadvantage of overly large size particles in the recording layer is excessive light scattering during readout. More particularly, whereas very small particles do not scatter sufficient reflected light to interfere materially with the resolution of readout by the method of the invention, some resolution is lost due to light scattering as the particle size increases much beyond the pigment size materials employed. Other light losses will be experienced from transmission through the recording medium if a transparent recording material is used which is not rendered substantially opaque to the incident readout light by incorporation in the recording material of sufficient reflective solids. For the photoconductive deformable members, it will be necessary to achieve a balance between absorption of some incident light and reflection in order to activate the photoconductor. Satisfactory results are achieved with a photoconductive recording layer exhibiting about 30 percent absorption and 70 percent reflection.

Certain general requirements of the materials of construction suitably employed for the present recording member can be illustrated with respect to the photoconductive type deformable storage members. That is to say, certain classes of materials may be used to fabricate common elements in both the photoconductive and nonphotoconductive type storage members hereinbefore described including the support element, conductor element, and even the thermoplastic portion of the surface recording element itself. Consequently, a description of suitable materials for the more elaborate photoconductive type storage member of the invention will be given with the understanding that all of the same materials, except those exhibiting photoconductive characteristics, can also be used for corresponding elements in the fabrication of a nonphotoconductive storage member. Substitution of a thermoplastic composition having all of the same general physical characteristics except for change of electrical resistivity responsive to light exposure for the the photoconductive thermoplastic compositions in the description satisfies the general requirements of a recording matrix for the nonphotoconductive type storage member.

The deformable photoconductive composition for a recording layer can be characterized as a film-forming solid which is itself photoconductive or which by addition of photoconductive material thereto can be rendered substantially photoconductive. The photoconductive properties of the medium are such that there is exhibited a dark resistivity of approximately $10^{15}$ ohm-centimeters with a corresponding reduction in resistivity of the medium upon illumination sufficient to permit conduction of the electrostatic charge from the surface to the underlying ground plane during the recording process. The ease with which the electrostatic charge at any point on the surface of the deformable photoconductive medium proceeds through the material to the grounding plane is determined by the intensity of the impinging light at that point. Hence, the residual charge pattern produced on the surface of the deformable photoconductive medium from which deformations are obtained directly by heating the medium to its softening point has a point-by-point correspondence with the light intensity variations of the exposure image. Additionally, the recording medium must also have certain electrical characteristics to produce the deformations consisting of an electrical resistivity greater than $3\times10^{10}$ ohm-centimeters when in the liquid state. For tape constructions, it is desirable for the deformable photoconductive medium to be sufficiently flexible and strong to enable rolling up around small diameter mandrels for storage and ease of recording. The deformation temperature of this medium is also important and the composition should exhibit a fairly sharp melting point in order for the development of the deformation image on the surface of the member to proceed with a minimum of control difficulties. For general use, the deformable photoconductive medium should be a solid at temperatures of at least 65° C. but should be capable of being converted to a liquid by heating to temperatures of about 85° C., depending on the thermal stability of the substrate. If a supported substrate is resistant to temperatures well above 200° C. or higher, then it is possible to use thermoplastic compositions having softening or liquid points well above the minimum 85° C. recited. Since the recording medium may also have backings which do not have thermal resistance that some of the inflexible support materials may have, it is essential that the liquid temperature of the thermoplastic medium be somewhat lower than the temperature at which the substrate material itself may be fused or lose its backing strength. Since suitable backing may be, for instance, glass, metal, or some heat resistant polymer such as an aromatic polyester or aromatic polyamide having a fusion temperature above 150° C. or higher (as, for instance, those described in Journal of Polymer Science, vol. 40, pages 289, 418, November 1959), it is apparent that higher melting deformable thermoplastic compositions can be employed within the scope of the invention.

Still other physical and rheological properties of the deformable thermoplastic composition are important in the recording media of the present members having a tape construction, including adhesion of the composition to the substrate and lack of cold flow in the composition. Since the recording tape may comprise at least two layers, and more often three layers, it is essential that the deformable thermoplastic composition have good adhesion to the backing material, whether it is a supporting dielectric base layer or the conducting inner layer. Absence of cold flow in the thermoplastic composition is desirable to prevent any change in configuration of the recorded information-bearing deformations as well as to prevent sticking between successive layers of the tape during storage in the wound condition.

Suitable thermoplastic photoconductive compositions having all of the desirable characteristics above described may be selected from a broad class of materials including such diverse compositions as thermoplastic photoconductive polymers, mixtures of inorganic photoconductive solids with thermoplastic nonphotoconductive polymers, and mixtures of organic photoconductive compounds with thermoplastic nonphotoconductive polymers. Thus, suitable recording compositions may be selected from the known class of thermoplastic photoconductive polymers including ring substituted aromatic polymers with the substituents selected from the group consisting of halogen, amine, sulfur-oxide, nitrogen-oxide radicals such as substituted diphenyl polymers, and the like. Inorganic photoconductive materials which can be added to an otherwise acceptable thermoplastic polymer in order to render the entire mixture substantially photoconductive, can be selected from the class of elemental compounds such as selenium, sulfur, cadmium sulfide, and even solid solutions of mixed crystals. Suitable organic dyes for incorporation with a nonphotoconductive thermoplastic polymer having the desired properties include crystal violet, malachite green, basic fuschin, trypaflavine, methylene blue, pinacyanol, kryptocyanine, neocyanine, and even certain proteins. Useful nonphotoconductive thermoplastic polymers for admixture with a photoconductor so as to result in a photoconductive mixture may be selected from the class of known polymers including acetals, acrylics, polyesters, silicones, and vinyl resins having the desired physical properties. It is obvious that mixtures of thermoplastic organic polymers may be employed, satisfying all of the above requirements, and one mixture found satisfactory is a blend of polystyrene, m-terphenyl, and the copolymer of 95 percent butadiene with 5 percent styrene, in ratios of 70 percent of polystyrene, 2 percent m-terphenyl, and 28 percent of the copolymer.

Useful optically reflective solids for incorporation into the recording element of the information storage member may generally be characterized as individual discrete particles having a particle size less than the desired resolution of the recording. Suitable materials do not react chemically with the other constituents of the recording medium to any great degree and exhibit sufficient thermal durability to retain shape and identity at the elevated recording temperatures. Particulate materials having a regular surface contour such as spheres, ellipsoids, and the like, together with a particle size around 325 mesh U.S. screen size and smaller are preferred for a minimum of light scattering at the high information storage densities of recording for which the present members are particularly adapted. While it is apparent that less stringent size and contour requirements may be acceptable if the desired resolution of recording is relatively macroscopic, the particle size of the optically reflective materials must still be substantially less than the size of the individual information-bearing deformations in order to preserve faithfulness of recording. It is believed that the particular chemical composition of the optically reflective materials is not critical for the practice of the invention since all of the above-described properties are exhibited by a broad class of both inorganic and organic substances, particularly those used for fillers, pigments, and the like, with appropriate inorganic substances including powdered ferrous and nonferrous metals, metal oxides, ceramics, and others, while typical organic substances include powdered coal, particulate organic dyes, wood fillers, and others. The preferred particulate materials exhibit substantially greater reflectivity than absorption for more efficient use of light during the information retrieval operation of the recording process.

From the foregoing description, it will be apparent that an improved system and method of recording information directly on a deformable storage medium in the form of permanent physical deformations have been provided. Additionally, both photoconductive and nonphotoconductive type information storage members have been disclosed which are particularly adapted for retrieving the information from the deformations by reflected light, generally, so that a truly visible image is formed. It is not intended to limit the invention to the preferred embodiments above shown, since it will be obvious to those skilled in the art that certain modifications of the present teachings can be made without departing from the true spirit and scope of the invention. For example, it will be obvious that other reflective optical systems may be used to retrieve the information from the recording member having means for projecting a light beam onto the recording surface associated with the lens system for projecting the reflected beam onto a viewing screen. Such readout systems are well known and generally termed "light scattering" projection systems, including such arrangements as the epidiascope, nephelometer, and the like. It is intended to limit the present invention, therefore, only to the scope of the following claims.

What I claim as new and desire to secure by Letters Patent of the United States is:

1. An information storage member for recording information in the form of light-modifying deformations on the recording surface of the member which comprises a supported layer of a dielectric thermoplastically deformable organic material containing as a dispersion therein a sufficient quantity of optically reflective particulate solids of particle size below the desired resolution of recording to reflect a beam of light projected onto the surface of the supported layer.

2. An information storage member for recording information in the form of light-modifying deformations on the recording surface of the member which comprises a thermoplastic photoconductive layer containing a sufficient quantity of optically reflective particulate solids of particle size below the desired resolution of recording to reflect a beam of light projected onto the surface of the layer, supported on a conducting substrate.

3. An information storage member for recording information in the form of light-modifying deformations on the recording surface of the member which comprises a thermoplastic surface film containing a photoconductive material and containing a sufficient quantity of optically reflective particulate solids of particle size below the desired resolution of recording dispersed in the thermoplastic film to reflect a beam of light projected onto the surface of the thermoplastic film, supported on a conducting substrate.

4. An information storage member for recording information in the form of light-modifying deformations on the recording surface of the member which comprises a thermoplastic surface film containing a sufficient quantity of optically reflective particulate solids of particle size below the desired resolution of recording dispersed in the thermoplastic film to reflect the beam of light projected onto the surface of the thermoplastic film, a next adjacent photoconductive layer, and a conducting support.

5. A flexible information storage tape for recording information in the form of light-modifying deformations on the recording surface of the member which comprises a composite of a thin layer of a dielectric thermoplastically deformable organic material containing as a dispersion therein a sufficient quantity of optically reflective particulate solids of particle size below the desired resolution of recording to reflect a beam of light projected on the surface of the layer, adhered to a flexible support.

6. A flexible information storage tape for recording information in the form of light-modifying deformations on the recording surface of the member which comprises a composite of a thin layer of photoconductive thermoplastic material containing a sufficient quantity of optically reflective particulate solids of particle size below the desired resolution of recording to reflect a beam of light projected on the surface of the layer, adhered to a flexible conducting support.

7. A flexible information storage tape for recording information in the form of light-modifying deformations on the recording surface of the member which comprises a composite of a thin thermoplastic surface film containing a photoconductive material and containing a sufficient quantity of optically reflective particulate solids of particle size below the desired resolution of recording dispersed in a thermoplastic film to reflect a beam of light projected on the surface of the said thermoplastic film, adhered to a flexible conducting support.

8. A flexible information storage tape for recording information in the form of light-modifying deformations on the recording surface of the tape which comprises a composite of a thin thermoplastic surface film containing a sufficient quantity of optically reflective particulate solids of particle size below the desired resolution of recording dispersed in the thermoplastic film to reflect a beam of light projected on the surface of the thermoplastic film, a next adjacent flexible photoconductive layer adhered to the underside of the thermoplastic film, and an adherent flexible conducting support.

9. A flexible information storage tape for recording information in the form of light-modifying deformations which comprises a composite of a thin photoconductive thermoplastic surface film containing a sufficient quantity of optically reflective particulate solids of particle size below the desired resolution of recording dispersed in the film to reflect a beam of light projected on the surface of the film, a next adjacent flexible conducting layer adhered to the underside of the surface film, and a flexible dielectric support.

10. A flexible information storage tape for recording information in the form of light-modifying deformations on the recording surface of the tape which comprises a composite of a thin photoconductive thermoplastic surface film containing a sufficient quantity of optically reflective particulate solids of particle size below the desired resolution of recording dispersed in the film to reflect a beam of light projected on the surface of the film, a next adjacent flexible conducting layer adhered to the side of the surface film, and an adherent flexible support layer of a thermoplastic composition having a higher deformation temperature than the thermoplastic composition in the surface film.

References Cited by the Examiner

UNITED STATES PATENTS

| | | | |
|---|---|---|---|
| 2,776,339 | 1/1957 | Arni | 178—7.5 |
| 3,174,140 | 3/1965 | Hagopian | 340—174.1 |
| 3,196,206 | 7/1965 | Griffiths | 340—174.1 |

BERNARD KONICK, *Primary Examiner.*

T. W. FEARS, *Examiner.*